(12) United States Patent
Bocchi

(10) Patent No.: US 7,481,017 B1
(45) Date of Patent: Jan. 27, 2009

(54) BIRD DECOY

(75) Inventor: Leo Anthony Bocchi, 2033 Erie St., Klamath Falls, OR (US) 97601

(73) Assignee: Leo Anthony Bocchi, Klamath Falls, OR (US)

( * ) Notice: Subject to any disclaimer, the term of this patent is extended or adjusted under 35 U.S.C. 154(b) by 1538 days.

(21) Appl. No.: 10/131,018

(22) Filed: Apr. 23, 2002

Related U.S. Application Data

(60) Provisional application No. 60/340,401, filed on Dec. 14, 2001.

(51) Int. Cl.
*A01M 31/06* (2006.01)
(52) U.S. Cl. .......................................... 43/3
(58) Field of Classification Search ............. 43/2, 43/3
See application file for complete search history.

(56) References Cited

U.S. PATENT DOCUMENTS

| | | | |
|---|---|---|---|
| 1,290,359 A | | 1/1919 | Reid et al. |
| 2,441,753 A | | 5/1948 | Carpenter |
| 3,470,645 A | | 10/1969 | Mattson |
| 4,062,141 A | * | 12/1977 | Shjeflo ........................ 43/3 |
| 4,611,421 A | * | 9/1986 | Jacob .......................... 43/3 |
| 4,651,457 A | * | 3/1987 | Nelson ........................ 43/3 |
| 4,753,028 A | * | 6/1988 | Farmer ........................ 43/3 |
| 4,845,873 A | | 7/1989 | Hazlett |
| 4,928,418 A | * | 5/1990 | Stelly ........................... 43/3 |
| 5,144,764 A | | 9/1992 | Peterson |
| 5,172,506 A | * | 12/1992 | Tiley ............................ 43/3 |
| 5,572,823 A | | 11/1996 | Savaria |
| 6,050,017 A | * | 4/2000 | Barry ........................... 43/2 |
| 6,349,902 B1 | * | 2/2002 | Cripe ........................... 43/2 |

OTHER PUBLICATIONS

Printout of Web page from Platte River Waterfowlers (Toye Decoys—Snow Slayer Windless Windsocks), dated Nov. 14, 2000, 2 pages.
Printout of Web page from Catch the Wind (Garden Art), dated Nov. 14, 2000, 1 page.
Printout of Web page from North Wind Outdoor Co. (Hunter Series Windsock Decoys, Hunter Series Hovering Decoys, Economy Series Windsock Decoys), dated Nov. 14, 2000, 3 pages.

* cited by examiner

*Primary Examiner*—Kurt Rowan
(74) *Attorney, Agent, or Firm*—Banner & Witcoff, Ltd.

(57) ABSTRACT

A decoy for attracting fowl is disclosed. The decoy includes a head structure, a support that secures the decoy to the ground, and a wind-inflatable body that includes an opening through which wind passes to inflate the body. The body is attached to both the head structure and the support. With respect to the head structure, a first portion of the body is attached using an aperture in the head structure that has a continuous periphery. With respect to the support, a second portion of the body is attached such that the second portion is movable in relation to the first portion, thereby allowing a user to alter the shape of the opening in the body.

29 Claims, 3 Drawing Sheets

BIRD DECOY

CROSS-REFERENCE TO RELATED APPLICATIONS

This application is a continuation-in-part of U.S. Provisional Patent Application No. 60/340,401, entitled "Bird Decoy" and filed on Dec. 14, 2001, naming Leo Anthony Bocchi as inventor, which provisional patent application is incorporated entirely herein by reference.

FIELD OF THE INVENTION

The present invention relates to a decoy for attracting birds, including geese, turkeys, or ducks.

BACKGROUND OF THE INVENTION

Hunters often use decoys to lure fowl to a particular location. An early variety of decoy was formed of reeds or grasses that were woven into the general shape of an intended prey and colored accordingly. Additionally, feathers or other materials were often incorporated into woven decoys to impart a realistic appearance. A later form of decoy consisted of cork or other wood that was carved and painted so as to have the general appearance of the intended prey. These carved decoys were particularly suited for use on water to lure waterfowl, due to the natural buoyancy of the materials from which the decoys were formed.

In order to increase the visibility of decoys, and thereby increase the probability that airborne fowl will become aware of and attracted to the decoys, modern hunters often deploy dozens, if not hundreds, of decoys over relatively large areas of land or water. To facilitate such large deployments, the decoys used by modern hunters are typically lightweight, compact, and inexpensive to produce. These characteristics, however, are not generally found in woven and carved decoys. Accordingly, modern hunters often prefer decoys having a wind sock or other structure that inflates in the presence of wind.

One example of this type of decoy is shown in FIG. 1. As seen in this figure, decoy 10 includes a head structure 20 that is integrally formed with a stake 30. In addition, decoy 10 incorporates a flexible body 40 that has an opening 42. In order to deploy decoy 10, the hunter must insert stake 30 in an aperture 44 located in the lower portion of body 40 and adjacent to opening 42. The hunter then inserts the portion of body 40 that is located between an aperture 46 and opening 42 into a T-shaped slot 22 in head structure 20. A supplemental clip may be used to ensure that the portion of body 40 remains within slot 22. U.S. Pat. Nos. 4,611,421 to Jacob, 4,651,457 to Nelson et al., and 4,753,028 to Farmer, each of which is hereby incorporated by reference in their entirety, disclose further examples of this type of decoy.

As noted above, a hunter often deploys numerous decoys over an area of land. To deploy the decoys, the hunter must carry many decoys into the field and then move from one location to another location, thereby distributing individual decoys at each location. As is apparent from the discussion of decoy 10, various steps are necessary to deploy each decoy 10. These steps may amount to a significant expenditure of time when multiplied by the number of decoys that hunters often deploy. Furthermore, these steps may require that the hunter utilize both hands and have fine motor control, especially when inserting body 40 into slot 22. During cold or extreme weather conditions, however, the hunter may find that gloves are necessary. As will be appreciated by those of ordinary skill in the art, gloves may diminish fine motor control of the hands, thereby hindering the deployment process. Moreover, hunters may find that decoy 10 is best deployed when the hunter crouches or sits near the elevation of the ground. Handicapped individuals may therefore find deployment of these conventional decoys to be a difficult process.

As seen in FIG. 1, decoy 10 includes an opening 42 through which wind passes to inflate body 40, the length of opening 42 being fixed. As will be appreciated by those of ordinary skill in the art, the degree to which body 40 inflates and moves in the presence of wind is directly related to the vertical length of opening 42. When the vertical length of opening 42 is at its maximum, the sides of the opening 42 are pulled taught and cannot expand to catch the wind. Alternately, when the vertical length of opening 42 is at approximately half of its maximum, the sides of the opening 42 are loose and may move away from each other to catch the wind, which then inflates the body 40.

The process of hunting wild fowl may occupy a span of many hours. During this time, the intensity of the wind may change considerably. Accordingly, a hunter may wish to adjust the size of opening 42 in response to changing wind conditions. U.S. Pat. No. 5,172,506 to Tiley et al., hereby incorporated by reference, discloses a decoy with a drawstring that circumscribes an opening in an inflatable decoy body. The hunter may tie the drawstring so as to achieve different opening sizes according to prevailing wind conditions. Although this configuration may offer some improvement over the decoy disclosed in the Farmer patent, the process of untying and retying the drawstring for numerous decoys adds time to the deployment process and lengthens the time necessary to make an adjustment to previously deployed decoys when wind conditions change.

Accordingly, it would be desirable to have a decoy with a compact, lightweight design that can be easily deployed in large numbers. Further, it would be desirable to have a decoy that may be deployed in a relatively short span of time, with one hand, and while standing. Third, it would be desirable to have a decoy with a wind inflation opening for which the size may be adjusted quickly and with one hand.

BRIEF SUMMARY OF THE INVENTION

The present invention provides a decoy for attracting fowl. The decoy includes a head structure defining an aperture, the aperture having a continuous periphery. In addition, the decoy includes a wind-inflatable body and a support for supporting the head structure. The wind-inflatable body includes at least one opening through which wind may pass to inflate the body. With some embodiments of the invention, a first portion of the body is attached to the head structure using the aperture and a second portion of the body is attached to the support such that the second portion is movable with respect to the first portion, so that a use may thereby alter the area of the opening.

Various advantages and features of novelty that characterize the invention are pointed out with particularity in the claims. For a better understanding of the invention, its advantages, and objects obtained by its use, reference should be made to the drawings, and to the accompanying description, in which there is illustrated and described preferred embodiments of the invention.

DETAILED DESCRIPTION OF THE INVENTION

Figure 1:
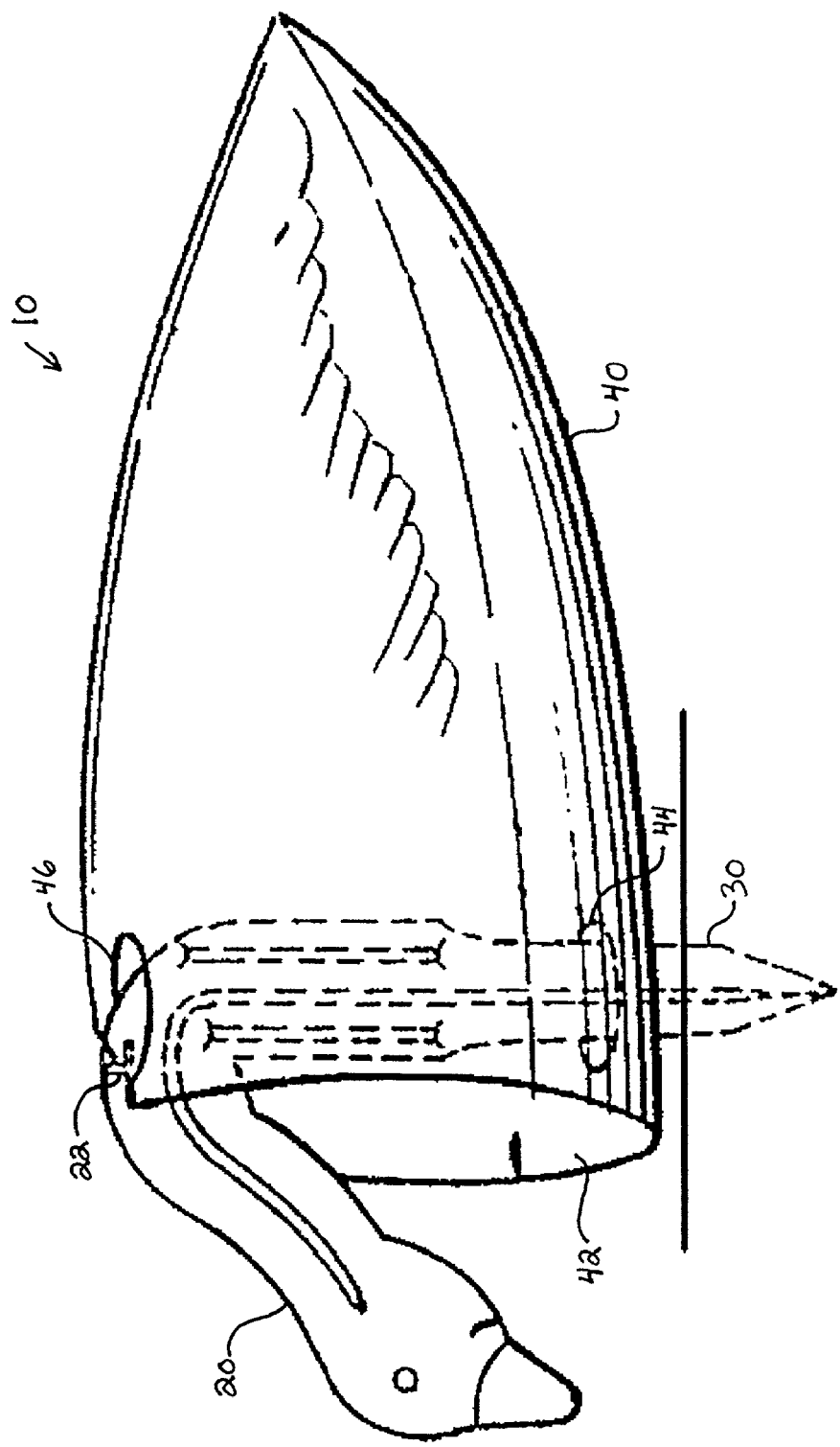
FIG. 1 is a side view of a conventional decoy.

FIG. 1 illustrates a bird decoy in accordance with one embodiment of the present invention, wherein like numerals indicate like elements. More particularly, this figure illustrates a decoy 100 that is configured to have the appearance of a goose. One skilled in the art will recognize, however, that the concepts and structures disclosed herein also apply to decoys having the appearance of other types of fowl, including turkeys and ducks.

Figure 2:
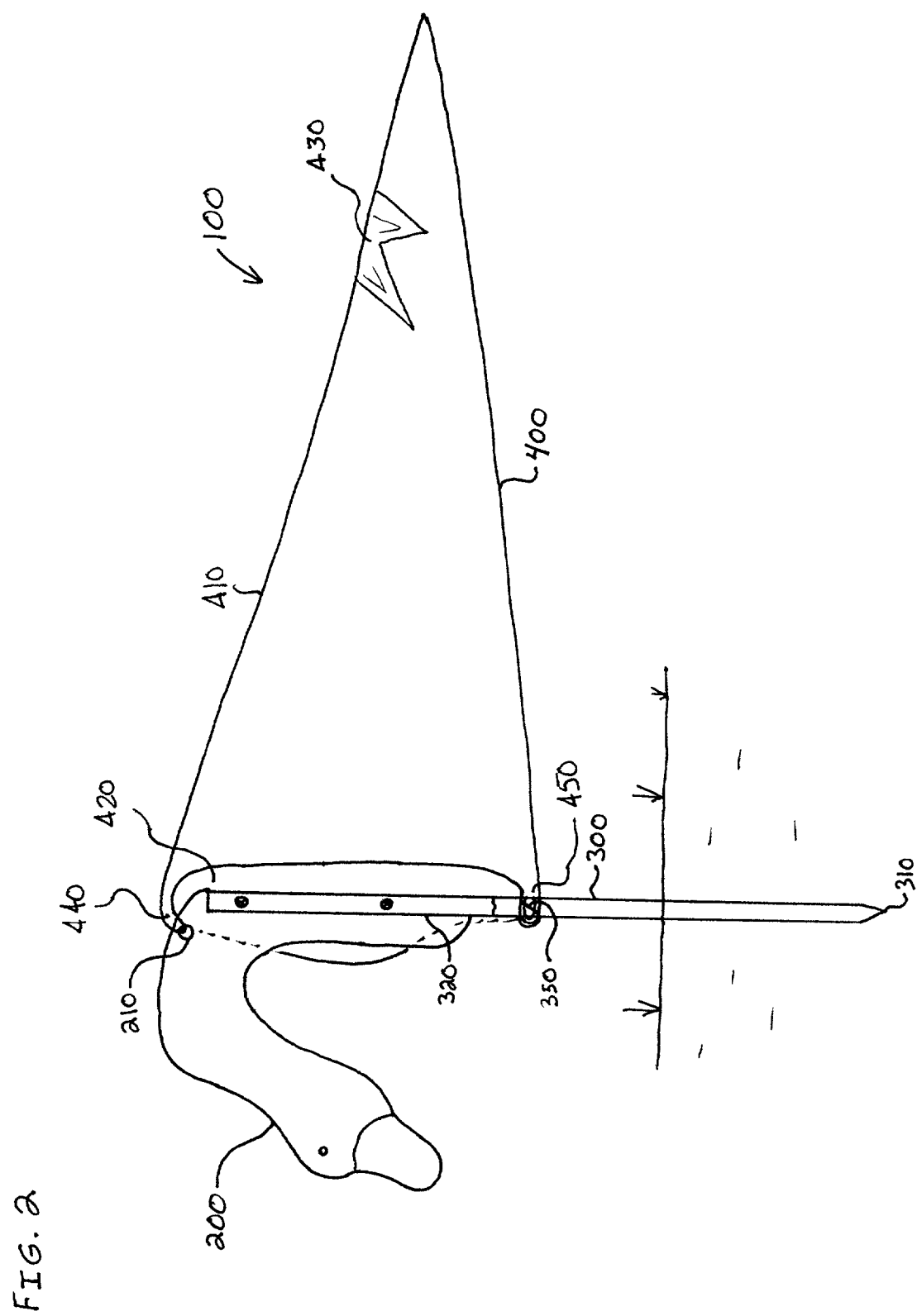
FIG. 2 is a perspective view of a decoy according to one embodiment of the present invention.

Decoy 100 includes a head portion made up of head structure 200 and support 300, and a body 400. Head structure 200 is attached to support 300 and includes an aperture 210 for attaching body 400, as described below. With the illustrated embodiment of the invention, head structure 200 is generally shaped to have the appearance of a goose head and neck. Other portions of a goose, including the legs, feet, and wings, may also be represented in head structure 200 in alternate embodiments of the invention. As depicted in FIG. 2, head structure 200 extends upward from support 300 and then bends downward and away from support 300, thereby simulating the posture of a feeding goose. Of course, head structure 200 may have a variety of alternate configurations that simulate differing postures of a goose.

In one preferred embodiment of the invention, as depicted in FIG. 2, the representation of various portions of a goose in head structure 200 is two-dimensional. That is, head structure 200 is formed of a thin, planar element having the outline of a goose profile. Some desired features of a goose, such as a goose bill, may be painted onto the surface while other features, such as an eye, may be painted, glued, or otherwise bonded to the surface of the head structure 200. Preferably, when viewed from the side, head structure 200 accurately portrays the profile of a goose.

As will be appreciated by those of ordinary skill in the art, one benefit of a two-dimensional head structure 200 is compact storage. Given the thin, planar configuration of head structure 200, many decoys 100 may be stacked such that the sides of each head structure 200 are parallel to one another. A second benefit of a two-dimensional head structure is low production cost, thereby providing a lower retail cost for the consumer. Given that hunters may purchase numerous decoys, a lower per unit cost may translate into a significant overall savings for a hunter. A third benefit is that a two-dimensional head structure 200 may act as a weather vane to enhance the operation of the decoy, as will be described in detail below.

Alternately, head structure 200 may have a three-dimensional configuration in which head structure 200 is formed from a non-planar material that has the three-dimensional shape of portions of a goose. A three-dimensional head structure may offer a more lifelike image of goose, to better attract prey.

A plurality of materials may be used to form the head structure 200, including wood, polymers, and metals, or any combination thereof. In general, the material chosen for head structure 200 should preferably be weather-resistant, inexpensive, lightweight, and durable. Given these considerations, one suitable material is a sheet of extruded polystyrene foam that is disposed between two cap sheets of solid polystyrene. This material is manufactured by Alusuisse Composites, Incorporated of St. Louis, Mo., for example, under the trade name of SINTREX. Other suitable materials include plywood, solid polymer sheets, and painted sheet metal.

Support 300 is attached to head structure 200 and provides a means for securing decoy 100 to the ground. According to some embodiments of the invention, the support 300 may be, e.g., a single stake having a driving point 310 as illustrated in FIG. 1. With this arrangement, a hunter may deploy the decoy 100 by placing point 310 of support 300 in contact with the ground and applying a downward force along the longitudinal axis of support 300, thereby driving point 310 and adjacent portions of support 300 into the ground. Under most conditions, friction forces between the ground and support 300 will then ensure that decoy 100 remains securely positioned.

The length of support 300 may vary depending upon the physical abilities of the hunter, the surrounding terrain, and the surrounding vegetation. Generally, the greater the length of support 300, the less bending that is required to insert support 300 into the ground, thereby assisting handicapped individuals. A support having a greater length is also well-suited for terrain that consists of sandy or loosely-packed soil because of the greater penetration depth that may be had with longer supports 300. Finally, a support 300 having a greater length places body 400 above many varieties of vegetation that may surround decoy 100, such as the stubble that remains after cutting grain. In light of the above considerations, a support that extends approximately 18 inches below head structure 200 is appropriate. One skilled in the art, however, may find that a greater or lesser length is appropriate.

Figure 3:
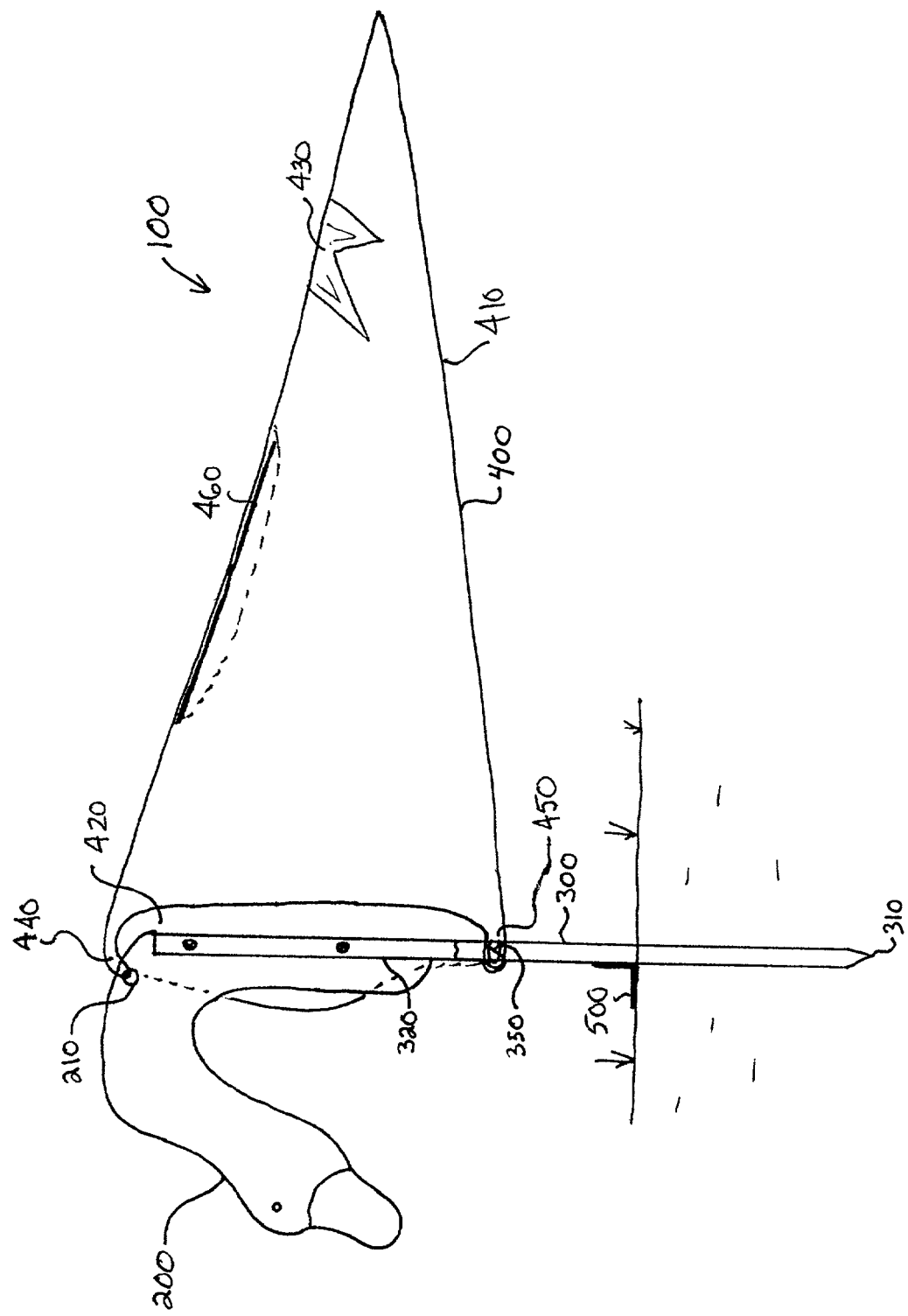
FIG. 3 is a perspective view of a decoy according to another embodiment of the present invention.

In extreme wind or locations where the soil is especially loose, a plate may be attached to decoy 100 for greater stability. One example of such a plate 500 is shown in FIG. 3. As seen in this figure, the plate 500 forms a plane perpendicular to the axial direction of the support 300. Thus, the plate 500 is parallel and flush with the ground when the portion of the support 300 below the plate 500 is inserted into the ground. A portion of the plate 500 is then secured to the support 300 using, e.g., a rivet, bolt, nail or other fastener, so that the plate 500 helps maintain support 300 upright when the plate 500 is flush with the ground. Of course, those of ordinary skill in the art will appreciate that other supplemental support structures, such as a tripod, can be used instead of (or in addition to) the plate 500.

Suitable materials for support 300 include wood, polymers, or metals. Wood and polymer materials generally have less strength and rigidity than metal. Accordingly, a thin support 300 that is formed of metal may be as strong and rigid as a thicker support 300 formed of wood or polymer materials. One advantage, therefore, of a metal support 300 is that the lesser thickness penetrates hard or frozen terrain more easily than a thicker support 300. If support 300 is formed of wood, as depicted in FIG. 2, point 310 may be fashioned in the end of support 300 that is opposite head structure 200 to facilitate ground penetration.

Depending upon the configurations and materials chosen for head structure 200 and support 300, support 300 may be attached to head structure 200 using any suitable technique. With respect to the embodiment depicted in FIG. 2, wherein head structure 200 is formed of a thin, planar material and support 300 is formed of wood, a slit 320 may be formed longitudinally in the portion of support 300 that attaches to head structure 200. Head structure 200 may then be inserted into slit 320 and secured, using an adhesive or screws, for example. Alternatively, head structure 200 may be secured to the side of support 300. Still further, the support 300 may be integrally formed with the head structure 200, i.e., the head structure 200 and the support 300 may be formed from a single piece of material.

Of course, the support 300 may be formed of structures other than a stake. For example, the support 300 may be a tripod, a weighted pedestal, or any other structure capable of supporting the head structure 200 and the body 400 during hunting conditions. Those of ordinary skill in the art will appreciate that different support structures may be desirable depending upon the terrain and environment in which the decoy 100 will be used.

With some embodiments of the invention, body 400 is formed of a wind-inflatable structure, such as a bag 410, that is attached to head structure 200 and support 300. An opening 420 in body 400, located adjacent to head structure 200 and support 300, provides an entry by which wind may enter and inflate body 400. The shape, size, and coloring of body 400, when inflated, may preferably be consistent with the shape, size, and coloring of the fowl that decoy 100 is intended to represent. For example, body 400, as depicted in FIG. 2, is intended to resemble the body of a goose in shape and size. To enhance the resemblance between the body 400 and the prey it is intended to represent, body 400 may include markings 430 that resemble specific features of the prey (e.g., a goose).

As will be appreciated by those of ordinary skill in the art, body 400 may have a variety of configurations. As depicted in FIG. 2, for example, body 400 is formed from the bag 410 having a general conic shape that includes only one opening 420, located adjacent to head structure 200 as previously noted. With alternate embodiments of the invention, body 400 may be formed from a structure having a second opening at the opposite end of the body 440 from the opening 420. Further, body 400 may have one or more other openings, or a shape that departs from the general shape of a cone. Body 400 may also include one or more distinct structures, such as wings.

Further, body 400 may be formed with a rigid or semi-rigid structure. While such a structure may be less compact and portable than a body 400 that is entirely wind-inflated, using a semi-rigid structure may allow the decoy to still function in conditions of little or no wind. For example, as shown in FIG. 3, body 400 may be formed of a bag 410 having a shaping support 460 supporting the bag 410, so that the bag extends radially outward from the support 300 in conditions with little or no wind. The shaping support may be formed by, e.g., one or more wires, ribs, or other structure suitable for making the body 400 semi-rigid. Thus, the particular embodiment illustrated in FIG. 3 includes a shaping support 460 formed of a stiff wire fixedly attached at one end (i.e., by passing a portion of the wire through the support 300) and radially extending away from the support 300 to form a spine for the body 400. Even with such a rigid or semi-rigid structure, however, it should be noted that the body 400 may still include an opening 420 for inflating in the wind.

For some embodiments of the invention, the material forming body 400 is weather-resistant, lightweight, and durable. As will be appreciated by those of ordinary skill in the art, the decoy 100 may be subjected to a variety of weather conditions, including high winds, rain, snow, freezing, and intense sunlight. To ensure that decoy 100 remains functional for numerous hunting seasons, the material from which body 400 is formed should, therefore, be capable of withstanding a variety of weather conditions. In addition, as described above, the body 400 of the decoy 100 may inflate in the wind to emphasize the decoy's resemblance to a bird. Accordingly, body 400 may be formed of a lightweight material that has the potential to inflate during even light wind. (It should be noted, however, that the decoy 100 may still be configured to resemble the intended prey even if no wind is present to inflate the body 400.) Further, the material that forms body 400 should also be durable enough to withstand the effects of repeated high wind situations, including the wear that may occur when portions of body 400 repeatedly contact the ground.

One material that is suitable for body 400 is a thin membrane of non-woven material formed of high density polyethylene, as manufactured by E.I. Dupont de Nemours and Company of Wilmington, Del., under the trade name of TYVEK. Other suitable materials include polymer sheets and woven cloths. Of course, those of ordinary skill in the art will appreciate a wide variety of materials that can be employed for the body 400 of the decoy 100 based upon the foregoing description, and these materials may also be used for the decoy 100.

With the embodiment of the invention illustrated in FIG. 2, the body 400 is semi-permanently attached to both head structure 200 and to the support 300. It should be noted, however, that the term "semi-permanently attached" as used herein is not intended to imply that body 400 may not ever be detached from the remainder of decoy 100. Instead, the term "semi-permanently attached" is used to refer to an attachment of the body 400 to the head structure 200 and support 300 such that the body 400 may remain attached to the head structure 200 and the support 300 continuously throughout both the use and storage of the decoy. As will be appreciated by those of ordinary skill in the art, if a hunter using the decoy 100 decides to replace body 400 with an alternate body 400, for example, body 400 may be detached from the head structure 200 and the support 300.

As previously noted, one drawback to some prior art decoys is that the body portion must be attached and detached for each deployment of the decoy, a process that may be both difficult and time consuming. With the invention, however, the semi-permanently attached body 400 may be wrapped around the head portion 200 and the support 300 when decoy 100 is not in use, rather than detached from the decoy 100. By providing semi-permanent attachment sites for body 400, deployment of decoy 100 may then advantageously be accomplished by simply unwrapping body 400 and inserting the support 300 into the ground.

A variety of techniques may be used to attach body 400 to head structure 200 or support 300 in this manner. With respect to the attachment of the body 400 to the head structure 200, a first portion 440 of body 400 that is adjacent to opening 400 may be threaded through aperture 210 and tied, for example, thereby forming a secure attachment. Between deployments, body 400 may remain attached to head structure 200, as noted above. As seen in FIG. 2, the aperture 210 may be formed in head structure 200 so as to have a continuous periphery (i.e., the aperture 210 has a closed circumference). That is, aperture 210 is configured such that the periphery of aperture 210 has no openings along its circumference that permit body 400 to be inserted through the edge of aperture 210. Some prior art decoys, for example, have slots that extend into the head structure. Thus, these slots have an opening in their circumference with flexible hooks that form the edge of the slot. Of course, with alternate embodiments of the invention, the body 400 may be attached to the head structure 200 with slots, as known in the art. Also, the body 400 may be semi-permanently attached to only to the support 300 at upper and lower positions, rather than being attached to the head structure 200.

With respect to support 300, body 400 may be easily attached to support 300 with a second portion 450 of body 400 that is adjacent to opening 420. This second portion 450 can be wrapped or tied around the support 300, and then secured to the support 300 using, for example, an elastic band 330, a clip, or other fastener. This type of wrapped configuration permits second portion 450 to be slid along the longitudinal length of support 300. When second portion 450 is positioned on a portion of support 300 that is in close proximity to head structure 200, the edges of opening 420 may expand away from the support 300 to catch the wind. On the other hand, when the second portion 450 is positioned on a portion of support 300 relatively far away from the head structure 200, the edges of opening 420 are pulled taught, and prevent wind from entering the body 400.

Accordingly, the shape of opening 420 available to catch the wind may be varied by altering the position of second portion 450 along support 300. That is, the adjustability of opening 420 permits a hunter to vary the amount of wind that enters body 400. In light winds, the hunter may configure the shape of opening 420 so as to provide the widest possible area for catching the wind, thereby ensuring that body 400 remains inflated. In heavier winds, the hunter may configure the shape of opening 420 to have a smaller available area for catching the wind, thereby limiting the stress on body 400 caused by heavy winds.

Thus, when deploying decoy 100, the hunter may make a determination concerning wind conditions and adjust the size of opening 420 accordingly. If wind conditions change, the hunter may quickly and easily alter the shape of opening 420 by sliding second portion 450 along support 300. In some prior art decoys employing a body with an opening, the shape of the opening can be adjusted using a drawstring provided around the circumference of the opening. Although this type of drawstring offers a method of adjusting an opening's shape, the time required to make the necessary adjustments to numerous decoys would be substantially more than the time required with the slidable second portion 450 of the present invention.

It should be noted that friction forces between second portion 450 and support 300 can be used to keep the second portion 450 at the intended position along the support 300. Other structures, however, such as hooks, can be used with the support 300 to ensure that the second portion 450 stays at the desired position along the support 300. Also, one skilled in the art will recognize that a variety of other attachment techniques may be used to provide a slidable attachment of the body 400 to the support 300. Such techniques are intended to fall within the scope of the present invention.

During the time that decoy 100 is deployed, the wind may change direction. Accordingly, decoy 100 may include a swivel mechanism that permits at least head structure 200 and body 400 to rotate about the longitudinal axis of support 300, thereby permitting decoy 100 to face into the wind regardless of wind direction. When the head structure 200 is formed from a two-dimensional structure, the head portion 200 will act as a weather vane an assist in aligning the opening 402 of body 400 with the direction of the wind.

As disclosed, the present invention includes a number of advantages over prior art decoy designs. First, decoy 100 has a compact, lightweight design. If a polystyrene foam composite is used for head structure 200, wood is used for support 200, and a thin membrane of non-woven material formed of high density polyethylene is used for body 400, the total weight of decoy 100 may be approximately 4 ounces. In addition, decoy 100 may be compactly stored by wrapping body 400 around head structure 200 and support 300. Second, deployment of decoy 100 may be accomplished in a relatively short span of time, with one hand, and while standing. As noted above, deployment may be accomplished by unwrapping body 400, inserting point 310 into the ground, and adjusting the size of opening 420, a process that may be accomplished in a relatively short span of time and with one hand, thereby permitting the second hand to carry undeployed decoys. Additionally, the length of support 300 is such that the hunter does not have to bend significantly and may remain standing during deployment. Third, the size of opening 420 may be adjusted relatively quickly and with one hand to take full advantage of the available wind, as described above.

The present invention has been described above by way of specific, exemplary embodiments, and the many features of the present invention are apparent from the written description. Thus, it is intended that the appended claims cover all such features and advantages of the invention. Further, since various modifications and changes will readily occur to those skilled in the art, the specification is not intended to limit the invention to the exact construction and operation described.

What is claimed is:

1. A decoy for attracting fowl, the decoy comprising:
   a head structure configured to define an aperture with a continuous periphery;
   a support for supporting the head structure; and
   a wind-inflatable body attached to the head structure by passing a portion of the wind-inflatable body through the aperture.

2. The decoy of claim 1, wherein the portion of the wind-inflatable body is threaded through the aperture and tied.

3. The decoy of claim 1, wherein the head structure is configured to resemble a head of a fowl.

4. The decoy of claim 1, wherein the head structure is two-dimensional.

5. The decoy of claim 1, wherein the head structure includes extruded polystyrene foam disposed between two cap sheets of solid polystyrene.

6. The decoy of claim 1, wherein the support is a stake having a driving point.

7. The decoy of claim 1, further comprising a plate connected to the support for stabilizing the support.

8. The decoy of claim 1, wherein the support is a tripod or weighted pedestal.

9. The decoy of claim 1, further comprising a shaping support for supporting the wind-inflatable body.

10. The decoy of claim 1, further comprising a second portion of the wind-inflatable body attached to the support.

11. The decoy of claim 10, wherein the second portion of the wind-inflatable body is slidably attached to the support, such that the second portion may slide along a longitudinal length of the support.

12. The decoy of claim 11, wherein the second portion is wrapped around the support and secured with a fastener.

13. The decoy of claim 12, wherein the fastener is an elastic band or clip.

14. The decoy of claim 11, further including a securing structure to secure the second portion at a desired position along the longitudinal length of the support.

15. A decoy for attracting fowl, the decoy comprising:
    a head portion having
      a head structure, and
      a support for supporting the head structure; and
    a wind-inflatable body defining at least one opening, a first portion of the body being attached to the head portion at a first location and a second portion of the body being attached to the head portion at a second location, such that the second portion is movable with respect to the first portion to change the shape of the opening.

16. The decoy of claim 15, wherein the second portion of the body is slidably attached to the support, such that the second portion may slide along a longitudinal length of the support.

17. The decoy of claim 16, wherein the second portion is wrapped around the support and secured with a fastener.

18. The decoy of claim 17, wherein the fastener is an elastic band or clip.

19. The decoy of claim 15, further including a securing structure to secure the second portion at a desired position along the longitudinal length of the support.

20. The decoy of claim 15, wherein the head structure is configured to resemble a head of a fowl.

21. The decoy of claim 15, wherein the head structure is two-dimensional.

22. The decoy of claim 15, wherein the head structure includes extruded polystyrene foam disposed between two cap sheets of solid polystyrene.

23. The decoy of claim 15, wherein the support is a stake having a driving point.

24. The decoy of claim 15, further comprising a plate connected to the support for stabilizing the support.

25. The decoy of claim 15, wherein the support is a tripod or weighted pedestal.

26. The decoy of claim 15, further comprising a shaping support for supporting the wind-inflatable body.

27. A method of setting up a fowl decoy, comprising:
placing a decoy having a head structure, a support, and a wind-inflatable body defining an opening with a first portion that is slidably attached to the support such that the support supports the head structure; and
sliding the first portion of the wind-inflatable body along a longitudinal length of the support to adjust a shape of the opening defined by the wind-inflatable body.

28. The method of setting up a fowl decoy of claim 27, further comprising unwrapping the wind-inflatable body from around the head structure.

29. The method of setting up a fowl decoy of claim 27, further comprising:
threading a second portion of the wind-inflatable body through an aperture with a continuous periphery defined in the head structure; and
tying the second portion to secure the second portion to the head structure.

* * * * *